(12) United States Patent
Haldopoulos et al.

(10) Patent No.: US 7,985,343 B2
(45) Date of Patent: Jul. 26, 2011

(54) MODULAR FILTER ASSEMBLY

(75) Inventors: Dean Haldopoulos, Atlanta, GA (US);
Benjamin Hirokawa, Atlanta, GA (US)

(73) Assignee: Porex Corporation, Fairburn, GA (US)

( * ) Notice: Subject to any disclaimer, the term of this patent is extended or adjusted under 35 U.S.C. 154(b) by 829 days.

(21) Appl. No.: 11/756,509

(22) Filed: May 31, 2007

(65) Prior Publication Data
US 2008/0296238 A1    Dec. 4, 2008

Related U.S. Application Data

(60) Provisional application No. 60/810,010, filed on May 31, 2006, provisional application No. 60/809,981, filed on Jun. 1, 2006.

(51) Int. Cl.
*B01D 37/00* (2006.01)
(52) U.S. Cl. ........ 210/767; 210/806; 210/231; 210/788; 210/494.1; 95/286; 55/523; 55/484
(58) Field of Classification Search .................. None
See application file for complete search history.

(56) References Cited

U.S. PATENT DOCUMENTS

| 4,882,050 A | 11/1989 | Kopf ............................ 210/231 |
| 6,551,608 B2 | 4/2003 | Yao ............................... 424/409 |
| 2003/0062311 A1 | 4/2003 | Yao et al. ..................... 210/660 |
| 2008/0296238 A1 * | 12/2008 | Haldopoulos et al. ....... 210/806 |

FOREIGN PATENT DOCUMENTS
WO   WO 2007/143133   12/2007

OTHER PUBLICATIONS
IPER of Dec. 3, 2008, 5 pages.*

\* cited by examiner

*Primary Examiner* — Robert James Popovics
(74) *Attorney, Agent, or Firm* — Kilpatrick Townsend & Stockton

(57) ABSTRACT

Disclosed herein are modular filter assemblies having a plurality of stacked filter plates formed from a porous material. The filter plate can comprise a planar base portion from which a convoluted ridge wall, having a ridge outer side surface, a ridge inner surface, and a top ridge surface extends. A plurality of fluid inlet troughs and a plurality if fluid outlet troughs are defined by the ridge wall. Adjoining filter plates form a plurality of fluid inlet cavities defined by the fluid inlet trough of one filter plate and a portion of the bottom surface of the adjoining filter plate; and a plurality of fluid outlet cavities defined by the fluid outlet trough of the one filter plate and a portion of the bottom surface of the adjoining filter plate. In use, the plurality of fluid inlet cavities are in filtered communication with the plurality of fluid outlet cavities.

24 Claims, 9 Drawing Sheets

MODULAR FILTER ASSEMBLY

CROSS REFERENCE TO RELATED APPLICATIONS

This application claims the benefit of U.S. Provisional Application Ser. Nos. 60/810,010 filed May 31, 2006, and 60/809,981 filed Jun. 1, 2006, the entire contents of which are hereby incorporated by reference.

FIELD OF THE INVENTION

This invention relates generally to the field of porous filters and more particularly to modular porous filter assemblies for filtration of fluids containing one or more contaminants.

BACKGROUND OF THE INVENTION

Filters for fluids, including liquids and gases, have been known in the art. For instance, filters are commonly used in such systems as air filtration systems, water filtration systems, water purification systems, and the like. A common type of filter is a cartridge-type filter with a replaceable filter typically mounted on a core and placed into a filtration system. The replaceable filter is typically formed from a porous, relatively soft material having pores sized to prevent contaminants and/or other particles (hereinafter "contaminants" for the sake of convenience and without intent to limit) from flowing through the filtration system, while letting the fluid pass therethrough. However, contaminants and particles typically become embedded in such filters such that the filters must be replaced on a regular basis.

Typically, cartridge-type filters are cylindrical elements having a substantially open longitudinal center portion with radially-outwardly extending, longitudinal folded portions or pleats. A plurality of pleats is commonly arranged around a tubular core defining a cylinder. When viewed in a transverse cross-section, the pleats typically extend radially outward from the core toward the outer periphery of the filter. A drawback of this pleated design is that, because the filter industry has become standardized, the overall dimensions of the filter body are restricted and it therefore becomes difficult to increase the size of a filter beyond the conventional dimension of the filter body. Thus the filter capacity and effectiveness are limited by the surface area of the filter cartridge.

Because the effectiveness of the standard cartridge-type filter is generally a function of the surface area of the filter, several attempts have been made to modify the pleat design in order to increase the available surface area. For example, attempts have been made to modify the length at which a pleat extends from the center core toward the periphery of the cartridge. In one example, an attempt has been made to form pleats that are radially curved rather than having pleats that extend linearly from the core of the cartridge. The increase in the length of each radially curved pleat was intended to result in an increased surface area of the filter.

Despite these several attempts, conventional filter technology has been unable to achieve significant increases in surface area while maintaining industry accepted standards for overall filter dimensions. Accordingly, it would therefore be desirable to form a filter that has an increased surface area for removing contaminants from a fluid stream. The increase in surface area could in turn provide for an increased filtering capacity, and/or an increase in the effective service life of the filter.

SUMMARY OF THE INVENTION

The present invention relates, in part, to modular filter assemblies that are suitable for use in filtration of any fluid, including liquid or gas, that contains a contaminant. The inventive filter assemblies can, in one aspect, provide an increased surface area per unit of volume relative to those filters conventionally know in the art. As such, the filters of the present invention can in one aspect provide an increased filtering capacity for a given volume of space. In another aspect, the inventive filter assemblies of the present invention are readily customizable according to any desired size and configuration at relatively low capital expense. Still further, the filter assemblies of the present invention provide improved resistant to the undesired affects that can typically result from an increase in backpressures over the service life of a filter. Therefore, in another aspect, the filter assemblies of the present invention can provide an increased effective service life over the conventionally known filters.

In one aspect, the present invention provides a filter assembly comprised of a plurality of stacked filter plates formed from a porous material. The filter plate can comprise a planar base portion having an outer peripheral edge, a top surface, and a bottom surface. A convoluted ridge wall extends from the top surface of the base portion and has a ridge outer side surface, a ridge inner side surface, and a top ridge surface. A plurality of fluid inlet troughs is defined by the ridge outer side surface and a first portion of the base portion top surface. A plurality of fluid outlet troughs is defined by the ridge inner side surface and a second portion of the base portion top surface. At least a first and a second filter plate of the plurality of filter plates are stacked such that the ridge top surface of the first plate contacts the bottom surface of the second plate and to form: i) a plurality of fluid inlet cavities defined by the fluid inlet trough of the first filter plate and a first portion of the bottom surface of the second filter plate; and ii) a plurality of fluid outlet cavities defined by the fluid outlet trough of the first filter plate and a second portion of the bottom surface of the second filter plate. The plurality of fluid inlet cavities are in filtered communication with the plurality of fluid outlet cavities such that a fluid passing from the fluid inlet cavity to the fluid outlet cavity must pass through at least one of the ridge and filter plate base portion.

In another aspect, the present invention provides a method of filtering a fluid filtrate comprising providing a modular filter assembly as described above, in which the plurality of fluid inlet cavities are in filtered communication with the plurality of fluid outlet cavities such that a fluid passing from the fluid inlet cavity to the fluid outlet cavity must pass through at least one of the ridge and filter plate base portion; and passing a fluid containing a particulate contaminant from at least one fluid inlet cavity to at least one fluid outlet cavity.

In still another aspect, the present invention provides a method for manufacturing the modular filter assemblies described herein. The method generally comprises charging a desired porous filter material precursor composition into a mold configured to provide a filter plate having a desired size and shape. Once charged, the porous filter material precursor composition can then be sintered according to conventionally known sintering techniques known to one of ordinary skill in the art. Any desired number of filter plates can be prepared in order to provide a filter assembly comprising a desired plurality of filter plates in a stacked arrangement as described herein. It will be appreciated that, contrary to the methods known in the art for preparing molded filters, the method of the present invention does not require the usage of a core pin in order to mold the individual filter plates. As such, the concentricity of the inventive filter plates can be more uniform, thus enabling the manufacture of a more efficient filter assembly.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate several aspects of the invention and together with the description, serve to explain the principles of the invention.

DESCRIPTION OF THE PREFERRED EMBODIMENTS

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "filter plate" includes embodiments having two or more such filter plates unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the term or phrase "filtered communication" is intended to include aspects where in order for a fluid to pass from a fluid inlet cavity to a fluid outlet cavity, the fluid must pass through a filter medium such as, for example, a porous material. In one aspect, the porous filter medium can be a ridge wall and/or a filter plate base portion.

As briefly summarized above, the present invention provides a modular filter assembly suitable for filtering a fluid, e.g., a liquid and/or a gas. Without limitation, the modular filters of the present invention are well suited for use in such exemplary systems as air filtration systems, water filtration systems, water purification systems, and the like. One particular application for the modular filter assembly of the present invention is in recreational water filtration systems, such as pools, spas, hot tubs, and the like.

Figure 1:
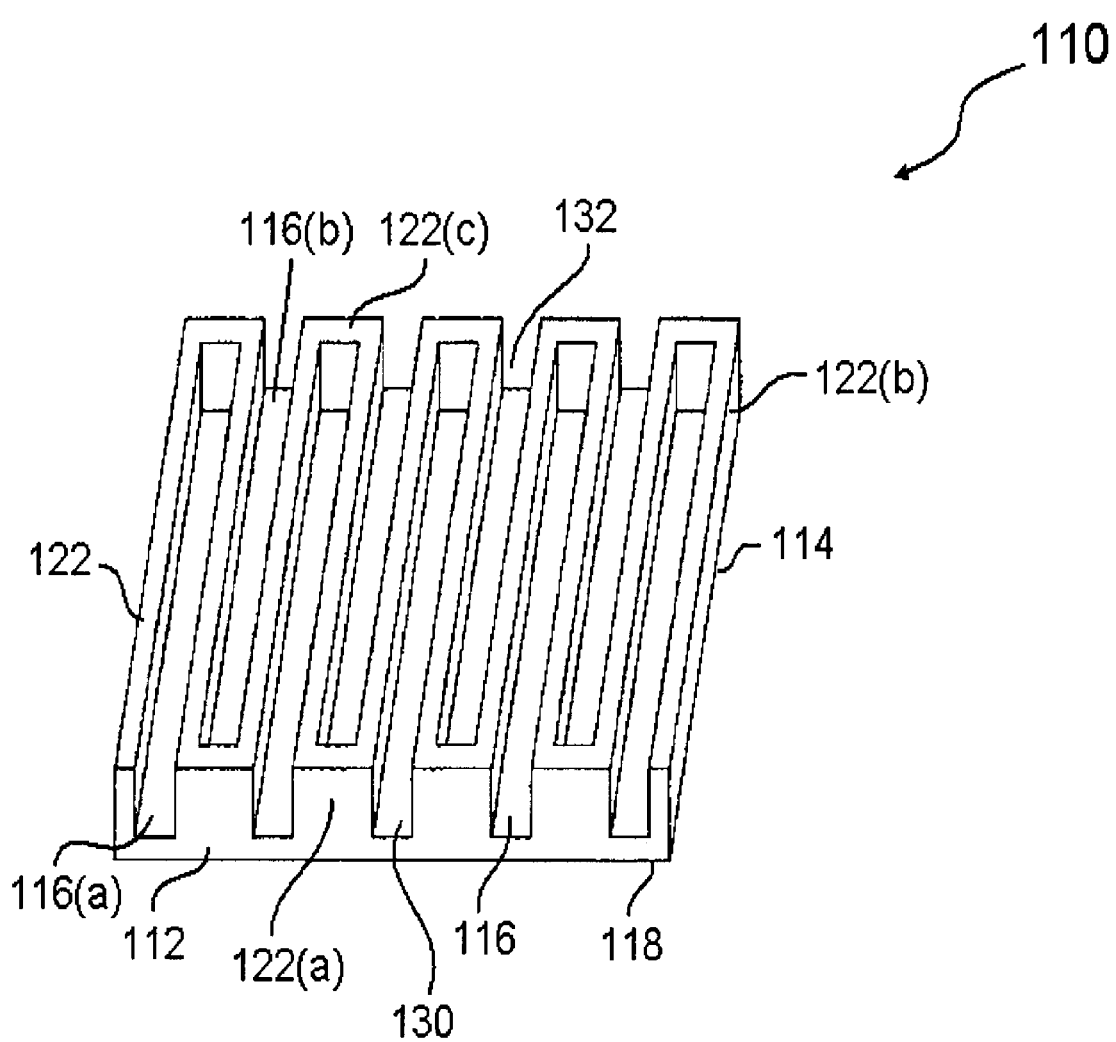
FIG. 1 is a perspective view of a stackable linear flow filter plate according to one aspect of the present invention.

With specific reference to the figures, a filter assembly 100 of the present invention is comprised of a plurality of stacked filter plates 110 formed from a porous material. As shown in FIG. 1, each filter plate 110 comprises a planar base portion 112 having an outer peripheral edge 114, a top surface 116, and a bottom surface 118. A convoluted ridge wall 122 having a ridge outer side surface 122(a), a ridge inner side surface 122(b), and a top ridge surface 122(c) is formed on and extends therefrom the top surface of the base portion. A plurality of fluid inlet troughs 130 are defined by the ridge wall outer side surface 122(a) and a first portion 116(a) of the base portion top surface. Likewise, a plurality of fluid outlet troughs 132 are also defined by the ridge wall inner side surface 122(b) and a second portion 116(b) of the base portion top surface.

Figure 2:
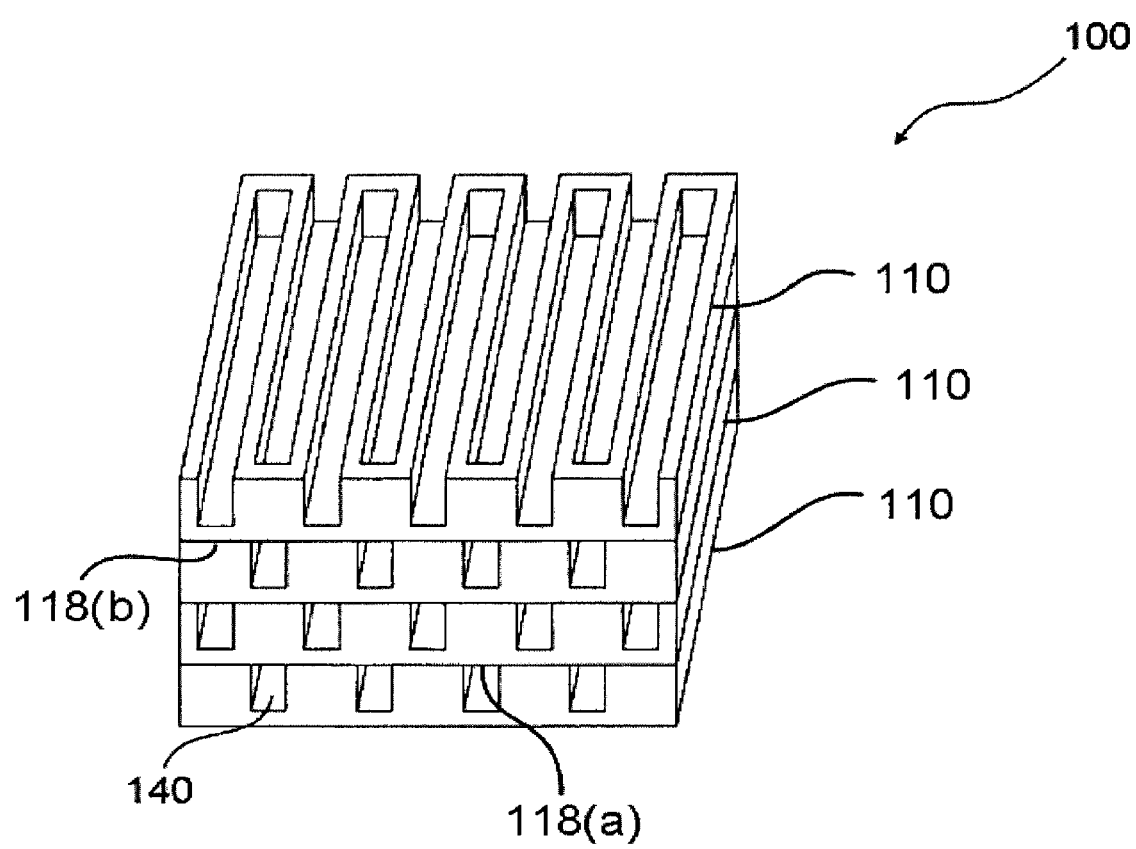
FIG. 2 is a perspective view of a plurality of stacked filter plates as shown in FIG. 1.

As shown in FIG. 2, a plurality of filter plates 110 can be stacked such that the ridge top surface 122(c) of a first plate is contacting the bottom surface 118 of an overlying second plate. When stacked in this manner, a plurality of fluid inlet cavities 140 are thereby defined by the fluid inlet troughs of a first filter plate and a first portion 118(a) of the bottom surface of an overlying adjacent second filter plate. Likewise, a plurality of fluid outlet cavities 142 (shown in FIG. 4) are also defined by the fluid outlet troughs of the first filter plate and a second portion 118(b) of the bottom surface of the adjacent overlying second filter plate. The resulting plurality of fluid inlet cavities are thus in filtered communication with the plurality of fluid outlet cavities such that any fluid passing from a fluid inlet cavity to a fluid outlet cavity must pass through at least one porous ridge wall and/or a porous filter plate base portion.

In one aspect, a plurality of filter plates 110 can be stacked in a predetermined orientation such that at least a portion of an inlet trough of a first filter plate is in underlying registration with at least a portion of an outlet trough of an adjoining filter plate. Still further, as shown in FIG. 2, a plurality of filter plates 110 can also be stacked relative to one another such that each inlet trough of the first filter plate is in underlying registration with an outlet trough of the second filter plate.

In forming a filter assembly of the present invention it should be understood that the shape of a filter plate and the corresponding configuration of the convoluted ridge wall can be provided in any desired manner that is capable of forming a plurality of inlet and outlet cavities when a plurality of the filter plates are stacked as described herein. For example, as shown in FIG. 1 and FIG. 2, the filter plates can be substantially rectangular in shape having, a convoluted ridge wall forming a plurality of substantially parallel closed end alternating inlet and outlet troughs. In this aspect, when a plurality of identical filter plates are stacked such that at least a portion of the inlet troughs of the first filter plate are in underlying registration with at least a portion of the outlet troughs of a second adjacent overlying filter plate, the resulting filter assembly is well suited for use as an in line or laminar flow filter.

Figure 3:
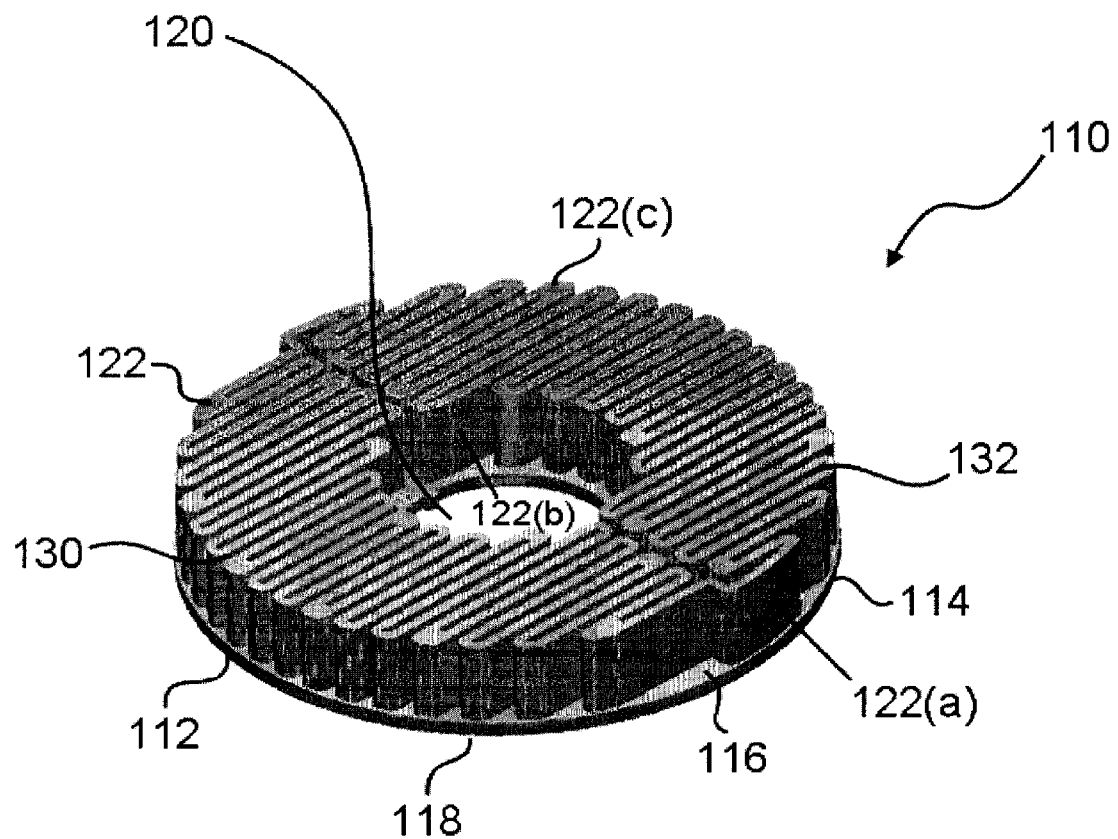
FIG. 3 is a perspective view of a stackable radial flow filter plate according to one aspect of the present invention.

In an alternative aspect, and as shown in FIG. 3, a stackable filter plate can have a substantially circular outer peripheral edge and a continuous convoluted ridge wall. The circular shape enables the formation of a substantially cylindrical filter assembly when a plurality of filter plates are stacked as described herein, and as further shown in FIG. 4. The filter plate base portion can define at least one opening 120 extending between the respective top and bottom surface of a filter plate base portion and positioned interior relative to the continuous convoluted ridge wall such that the plurality of fluid outlet troughs are in open fluid communication with the at least one opening 120.

Figure 5:
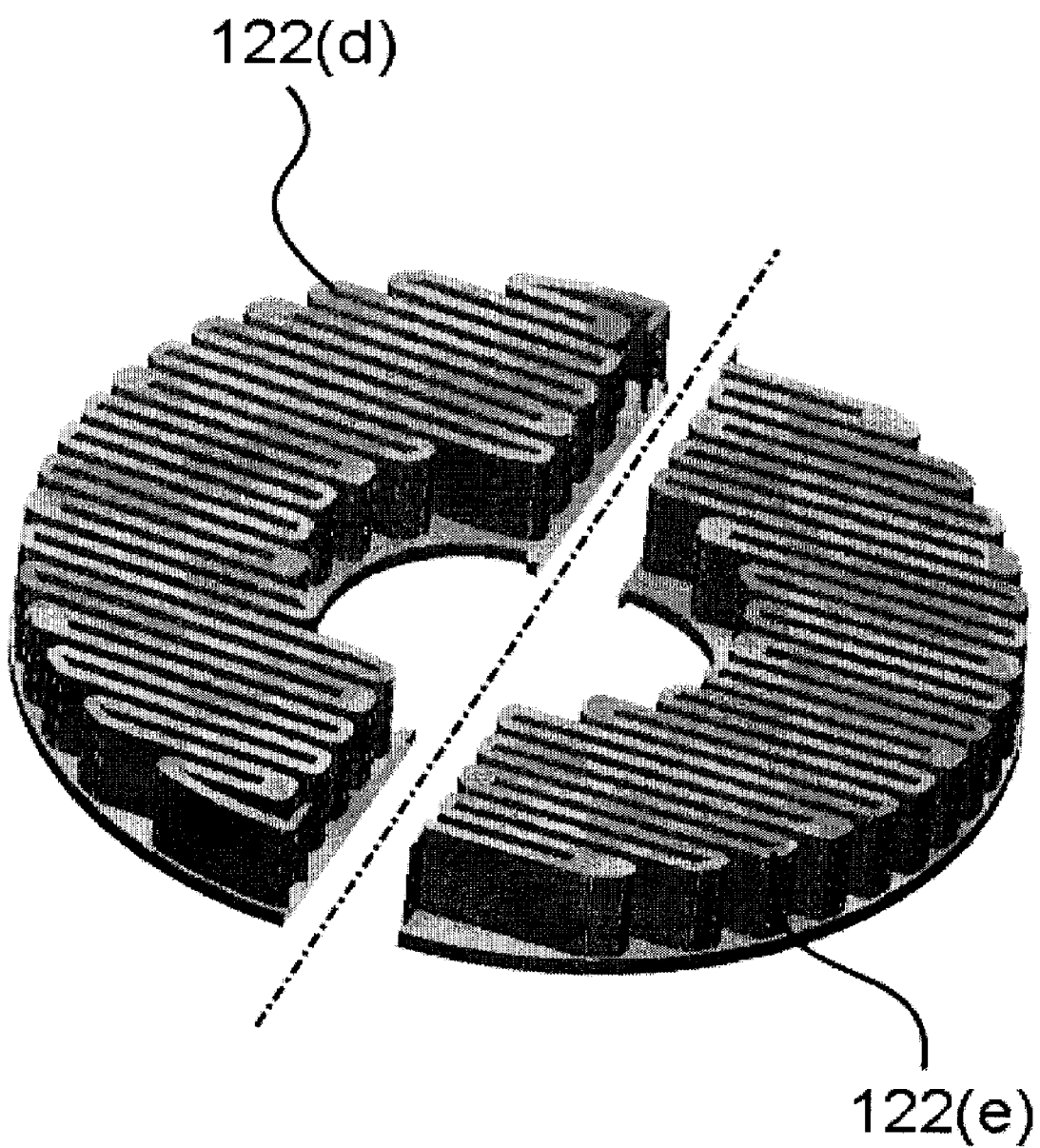
FIG. 5 is a perspective view of two convoluted ridge portions extending from the base plate portion of the filter plate of FIG. 3.

Once again, it is contemplated that the continuous convoluted ridge wall can have any desired configuration that is capable of defining a plurality of fluid inlet and fluid outlet troughs as described herein. For example, as shown in FIG. 5, the continuous convoluted ridge wall can have a first convoluted portion 122(d) defining a first plurality of substantially parallel inlet and outlet troughs, and an opposing second convoluted portion 122(e) defining a second plurality of substantially parallel inlet and outlet troughs. The first plurality of inlet and outlet troughs is positioned such that each inlet trough of the first plurality is oppositely aligned with an outlet trough of the second plurality. Likewise, each outlet trough of the first plurality is oppositely aligned with an inlet trough of the second plurality. According to this exemplified aspect of the invention, alternately stacked filter plates can be oriented 180 degrees relative to an adjacent filter plate such that at least a portion of the inlet troughs of a first filter plate are in underlying registration with at least a portion of the outlet troughs of a second adjacent overlying filter plate. If desired, the peripheral edge of the least one opening extending therebetween the respective top and bottom surface of the base plate portion can further define at least one key 150 for aligning the plurality of filter plates in a predetermined pattern of overlying registration.

Figure 4:
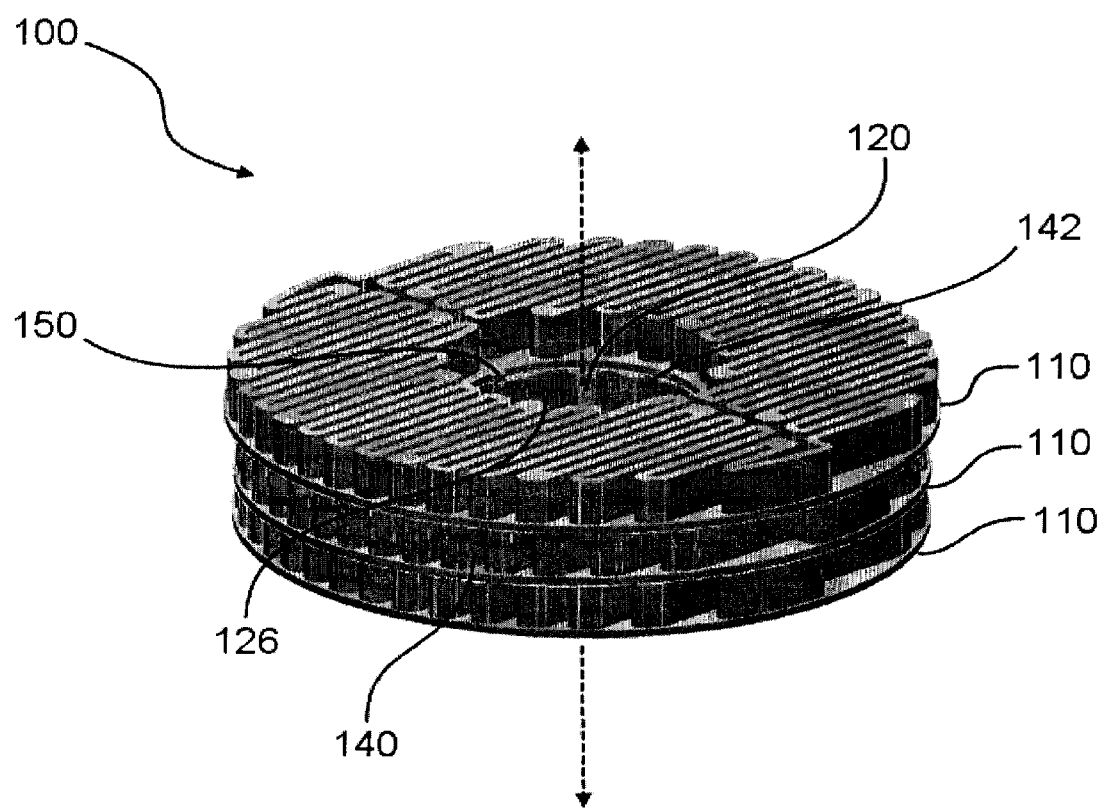
FIG. 4 is a perspective view of a plurality of stacked filter plates as shown in FIG. 3.
Figure 6:
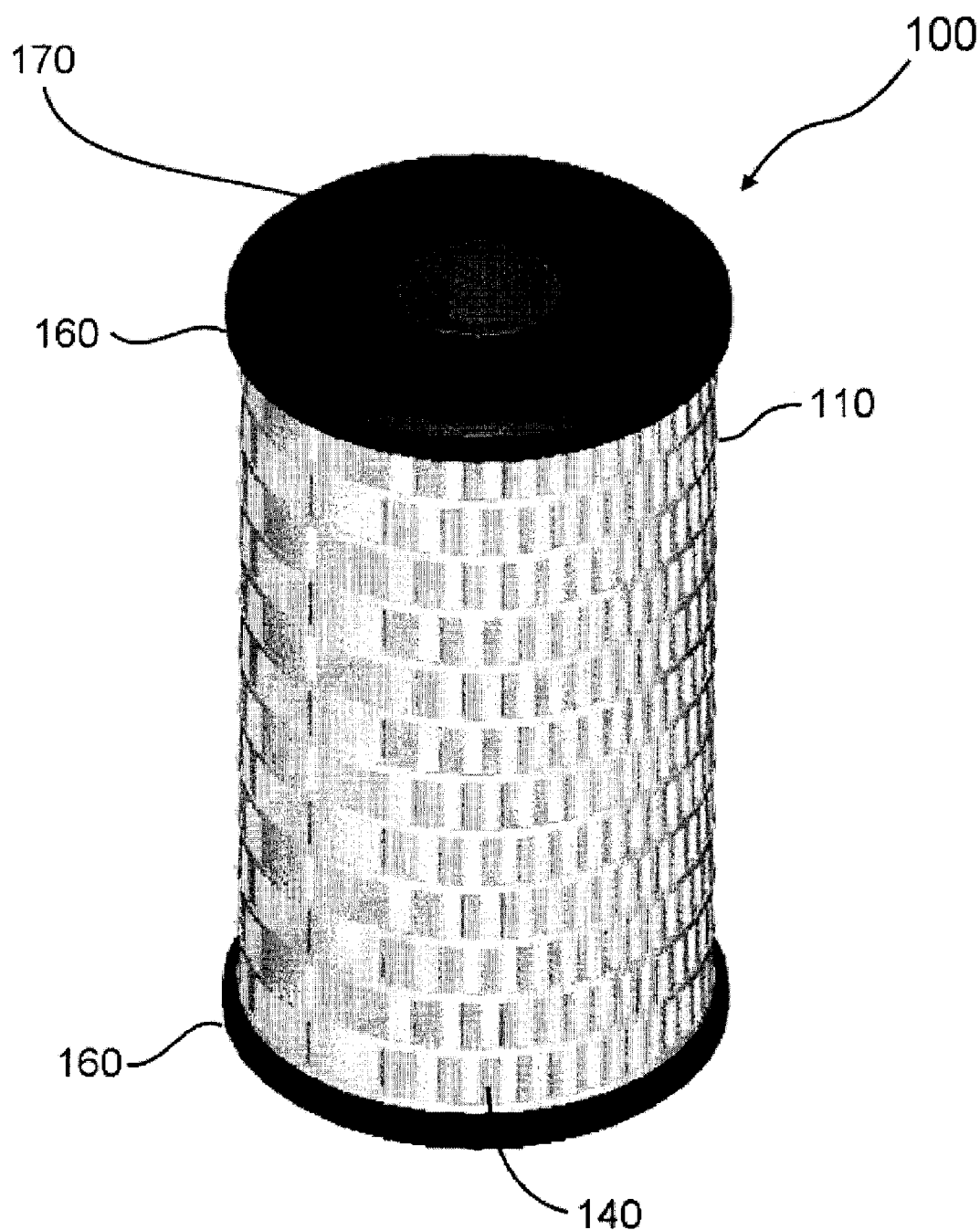
FIG. 6 is a perspective view of an exemplary filter assembly according to one aspect of the present invention.

As shown in FIG. 4, a stacked plurality of filter plates such as those shown in FIG. 3 can form a longitudinally extending cylindrical filter assembly. Further, the at least one opening 120 extending therebetween the respective top and bottom surface of each filter plate forms a longitudinally extending conduit 126 with the at least one opening of adjacent overlying and/or underlying filter plates. As further shown in FIG. 6, a plurality of stacked filter plates 110, forming the longitudinally extending conduit 126, can be positioned on a tubular or cylindrical core 170. End caps 160 can also be placed over the longitudinal ends of the stacked filter assembly, to thereby retain the stacked filter assembly in position relative to the core. The end caps can be used to maintain the stacked filter assembly at a desired level of compression. In use, a pressure gradient can be applied such that a fluid is directed into the plurality of formed fluid inlet cavities 140 and must traverse through a ridge wall and/or filter plate base portion to thereby enter a fluid outlet cavity in communication with the conduit 126 an any optional core 170 disposed therein and to filter out at least a portion of one or more contaminants within the fluid.

Figure 8A:
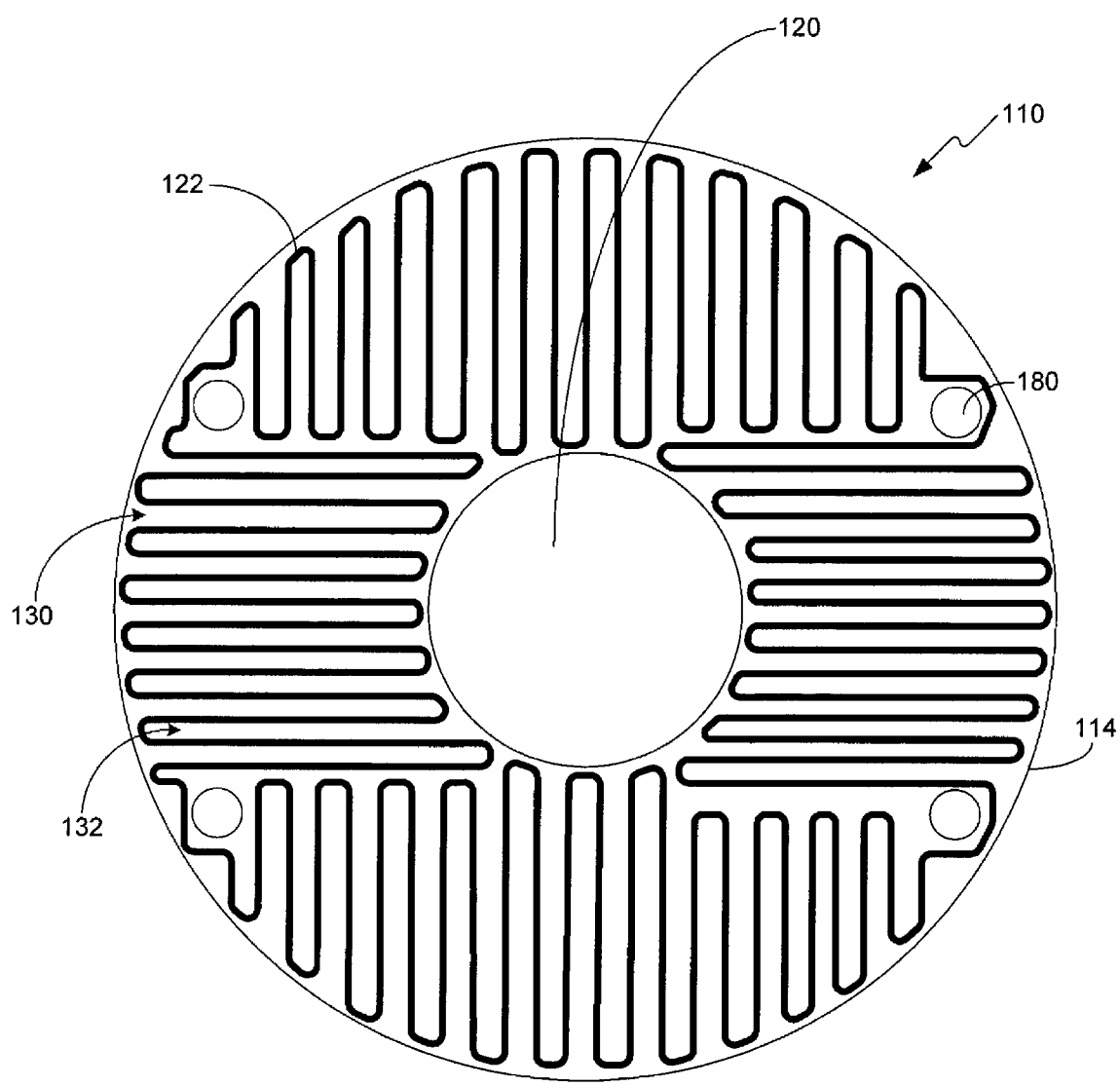
FIG. 8A is a plan view of a filter plate defining a plurality of apertures extending through the base plate portion, according to one aspect of the present invention.
Figure 8B:
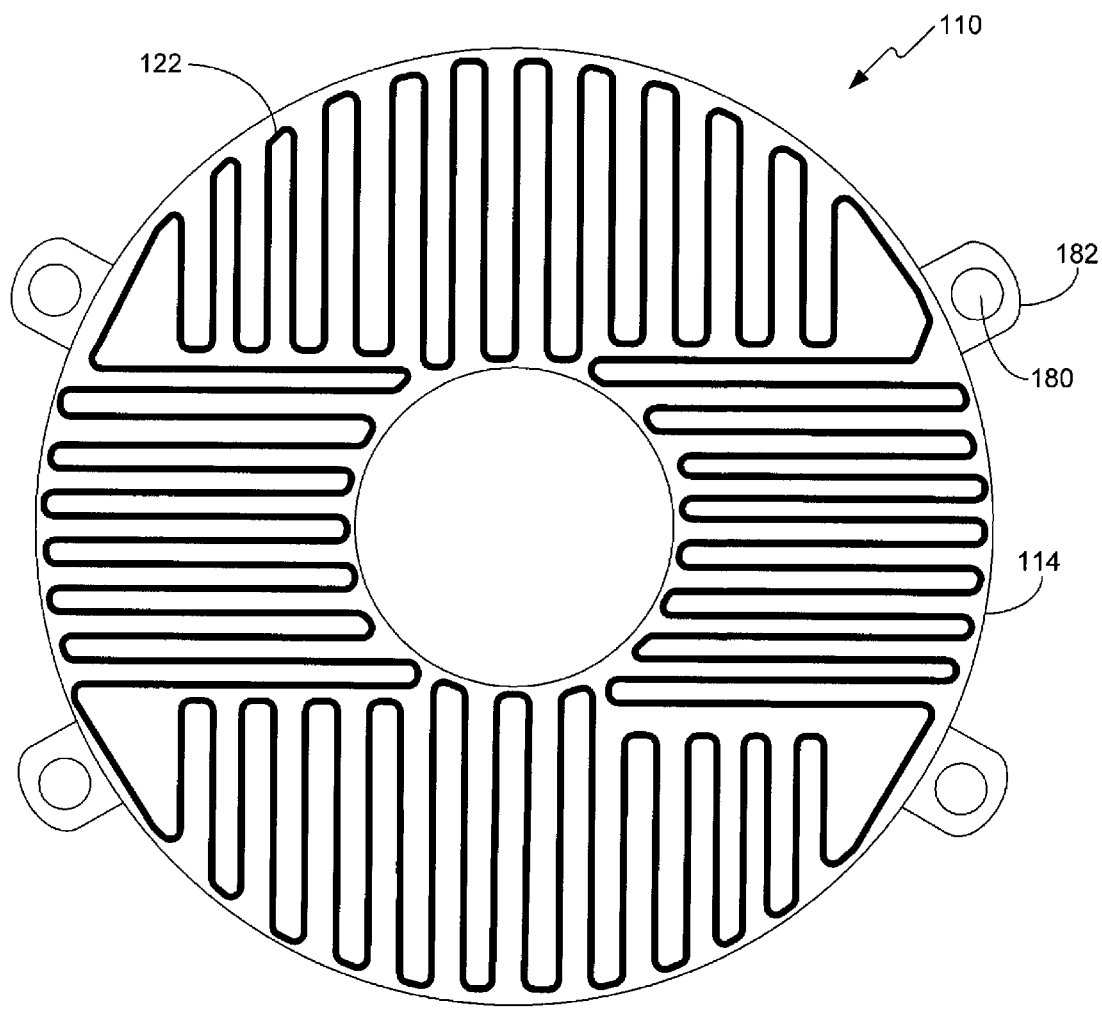
FIG. 8B is a plan view of a filter plate comprising a plurality of protrusions defining apertures therethrough, according to one aspect of the present invention.

In still another aspect, each of the plurality of filter plates can further define one or more apertures 180 extending through the planar base portion between the respective top and bottom surface. In one aspect, the aperture(s) can be defined apart from the at least one opening 120. For example, one or more apertures 180 can be defined proximate the outer peripheral edge of the base portion as illustrated in FIG. 8A. It is to be appreciated that the filter plates shown in FIGS. 8A and 8B are top plan views and are therefore shown without a convoluted ridge wall for exemplary purposes only. As will be appreciated, the convoluted ridge wall can be formed around the apertures in various manners as described herein. In yet another aspect, the base portion can comprise one or more protruding members 182 that protrude from the outer peripheral edge, such as shown in FIG. 8B. According to this aspect, each protruding member can define a respective aperture 180 extending therethrough. In either aspect, compression rods (not shown) can be provided and positioned within respective apertures of the plurality of filter plates to maintain the stacked filter assembly under a desired level of compression. End caps can be positioned on each end of the stacked arrangement and held in compression by the compression rods. Although FIGS. 8A and 8B show base plates defining four apertures, it is contemplated that any number of apertures can be provided that allow the filter plates to be held in compression by end caps.

In yet another aspect, it is contemplated that a plurality of filter plates can be welded, adhered, or otherwise fastened together so that the top ridge surface of the convoluted ridge wall of a first filter plate is fixed to the bottom surface of the planar base portion of a second filter plate. In this aspect, the filter plates can optionally be assembled to form a modular filter assembly without the use of compression means, such as compression rods, end caps, central core, and the like.

The filter assembly 100 of the present invention can be used for any fluids (i.e., liquids and gases), such as water, solvents, air, or the like. According to an embodiment of the present invention, filter 100 can be used in industrial or recreational water filters as well as municipal filters. For example, a filter formed in accordance with the principles of the present invention can be used to remove other particles (e.g., sand) from water prior to desalination for potable use. Furthermore, in an alternative embodiment filter 100 can be used in a laboratory to filter microbial contaminants from a solution.

As briefly summarized above, the filter assemblies of the present invention can, in various aspects, provide several advantages over the conventional filters known in the art. For example, it will be appreciated upon practicing the present invention that a filter assembly of the present invention can comprise any number of filter plates in a stacked arrangement. As such, the desired size of a filter assembly is easily customizable by virtue of simply altering the desired number of filter plates in a given stacked assembly. Additionally, the use of a plurality stacked plates having relatively short convoluted ridge walls can enable a relatively thinner convoluted ridge wall to be used while still maintaining operability under increased backpressures that may occur during the effective service life of the filter. To this end, and without limitation, it is contemplated that the present invention can provide filter plates having convoluted ridge walls and planar base portions of any desired thickness. For example, in one aspect the thickness of the convoluted ridge wall or planar base portion can be less than 0.050 inches, less than 0.040 inches, less than 0.030 inches, or even less than 0.020 inches.

Figure 7:
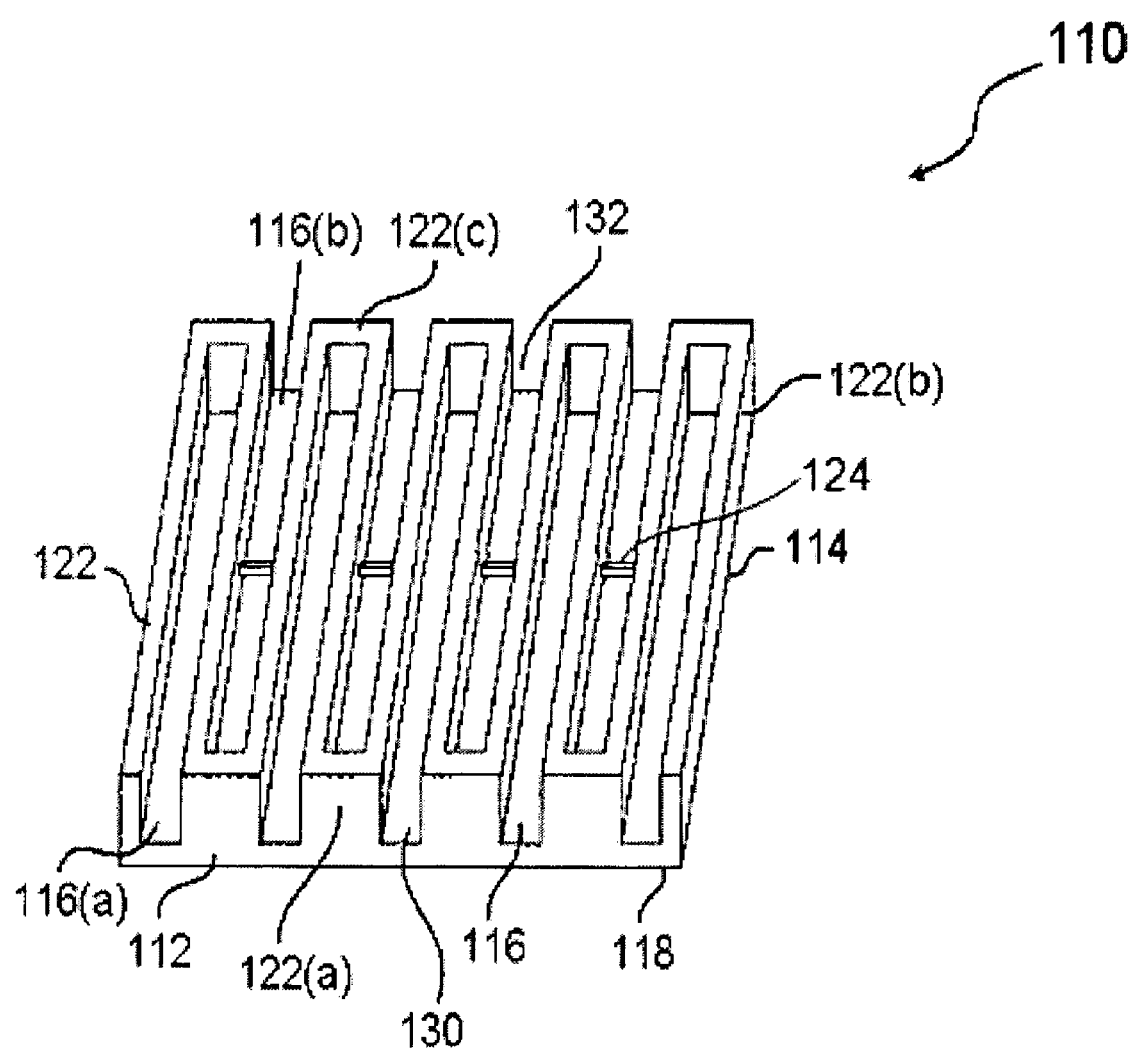
FIG. 7 is a perspective view of a stackable linear flow filter plate comprising support ribs, according to one aspect of the present invention

Similarly, the height or distance that the convoluted ridge wall extends from the base portion of a filter plate can be any desired length or height and can vary depending on the intended use of the filter. For example, and without limitation, the height of the convoluted ridge wall can be at least 0.10 inches, at least 0.25 inches, at least 0.50 inches, 0.75 inches, or even at least 1.0 inches. To that end, as fluid enters the inlet troughs, the force of the fluid can tend to push the ridge wall in the direction of the flow. The forces may increase as the walls trap particulate material in the filter media. Accordingly, with reference to FIG. 7, the ridge walls can be provided with support ribs 124 to support the ridge walls and to resist the tendency of the fluid pushing the ridge wall in the direction of the flow. It is contemplated that, in one aspect, the support ribs will extend upwardly from the top surface of the base plate at a height that is less than the height of the ridge walls, so as to allow the movement of fluid over the support ribs. Further, the support ribs can b provide in either or both of the inlet or outlet troughs. However, in one aspect it is preferred for the support ribs to be formed or provided only within the outlet troughs. Thus, as the outer ridge wall accumulates particulate matter, it can be easily cleaned without interference from support ribs. Support ribs can be added as needed based on the rigidity of the ridge walls, the height of the ridge walls, and the forces on the ridge walls. Although the support ribs are shown in FIG. 7 in a linear or laminar filter plate, it is contemplated that support ribs can be provided in a filter of any shape, such as a radial flow filter plate as shown in FIG. 3.

Still further, the present invention also provides the ability to produce filters having increased surface area per unit of volume relative the conventional filters known in the art. For example, in one aspect, the ability to utility a relative thin ridge wall, as discussed above can enable the preparation of a filter plate having an increased surface area for a given quantity of porous material. Additionally, the incorporation of the filter plate base portion as a viable filter surface area can also increase the effective surface area of the inventive filter assembly. As such, it should be understood that the filter assembly of the present invention can be prepared having any desired surface area per unit of volume. For example, and without limitation, a filter assembly comprising a plurality of stacked filter plates depicted in FIG. 3, wherein each filter plate has an outside diameter of approximately 6 inches, and inside diameter of approximately 2 inches and stacked length of approximately 10 inches can have a surface area of at least 7 square feet, at least 10 square feet, at least 12 square feet, at least 15 square feet, at least 20 square feet, or even at least 25 square feet.

The filter plates of the present invention can be formed from any conventional porous material. However, in one aspect, the porous material is a sintered porous material, such as a sintered porous thermoplastic material. Some suitable base materials that can be used to provide the porous thermoplastic substrate are described in U.S. Pat. No. 6,551,608 to Yao; Pending U.S. Published Application No. U.S. 2003-0062311-A1, both of which are incorporated herein by reference in their entirety. Suitable thermoplastics for use in forming filter 100 of the present invention include, but are not limited to, polyolefins, nylons, polycarbonates, poly(ether sulfones), and mixtures thereof, as well as fluoropolymers, such as polyvinylidene difluoride (pvdf) and polytetrafluoroethylene (ptfe). A preferred thermoplastic is a polyolefin. Examples of suitable polyolefins include, but are not limited to: ethylene vinyl acetate; ethylene methyl acrylate; polyethylenes; polypropylenes; ethylene-propylene rubbers; ethylene-propylenediene rubbers; poly(1-butene); polystyrene; poly(2-butene); poly(1-pentene); poly(2-pentene); poly(3-methyl-1-pentene-); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof. A preferred polyolefin is polyethylene. Examples of suitable polyethylenes include, but are not limited to, low density polyethylene, linear low density polyethylene, high density polyethylene, ultra-high molecular weight polyethylene, and derivatives thereof. In alternative embodiments the filter material may also be composed of or formed from sintered metal, steel mesh, woven metal, ceramic materials, non-woven materials, bi-component, continuous, or staple fiber media using an extrusion or pultrusion process.

Examples of polyolefins suitable for use in the invention include, but are not limited to: ethylene vinyl acetate (EVA); ethylene methyl acrylate (EMA); polyethylenes such as, but not limited to, low density polyethylene (LDPE), linear low density polyethylene (LLDPE), high density polyethylene (HDPE), and ultra-high molecular weight polyethylene (UH-MWPE); polypropylenes; ethylene-propylene rubbers; ethylene-propylene-diene rubbers; poly(1-butene); polystyrene; poly(2-butene); poly(1-pentene); poly(2-pentene); poly(3-methyl-1-pentene-); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof.

The porous thermoplastic materials of the invention can further comprise materials such as, but not limited to, lubricants, colorants, fillers, and mixtures thereof. Suitable fillers include, but are not limited to: carbon black, cellulose fiber powder, siliceous fillers, polyethylene fibers and filaments, and mixtures thereof.

Sinterable thermoplastics other than those recited herein can also be used in this invention. As those skilled in the art will appreciate, the ability of a thermoplastic to be sintered can be determined from its melt flow index (MFI). Melt flow indices of individual thermoplastics are known or can be readily determined by methods well known to those skilled in the art. For example, an extrusion plastometer made by Tinius Olsen Testing Machine Company, Willow Grove, Pa., can be used. The MFIs of thermoplastics suitable for use in this invention will depend on the particular porous thermoplastic material and/or the method used to prepare it. In general, however, the MFI of a thermoplastic suitable for use in the materials and methods of the invention is from about 0 to about 15. The temperatures at which individual thermoplastics sinter (i.e., their sintering temperatures) are also well known, or can be readily determined by routine methods such as, but not limited to, thermal mechanical analysis and dynamic mechanical thermal analysis.

The characteristics of a sintered porous material can depend on the average size and distribution of the particles used to make it as well as the particles' average shape. In one aspect of the invention, the thermoplastic particles are substantially spherical. This shape provides certain benefits. First, it facilitates the efficient packing of the particles within a mold. Second, substantially spherical particles, and in particular those with smooth edges, tend to sinter evenly over a well defined temperature range to provide a final product with desirable mechanical properties and porosity. Typical pore size starting approximately at 5 μm and up to approximately 500 μm is preferred, however, smaller and larger pore sizes are also possible. For example, the pore sizes can be as low as about 1 m and as high as about 500 μm, whereas the porosity can be as low as about 30% and as high as about 90%. Pore size and porosity selection is obvious to one of ordinary skill in the art depending on the process and/or the starting material selected.

Preferably, a filter plate 110 is molded from sintered porous plastic. According to an embodiment of the invention a mold having a desired configuration can be filled with sintered porous plastic precursor composition, such as for example, a powder batch and the particles can be fused together by heating to form the resulting filter plate 110 in the shape of the mold. The particular sintering conditions are known in the art and will depend, in part, upon the particular sintered porous plastic precursor composition. To this end, one of skill in the art will be able to determine the particular sintering conditions without requiring undue experimentation.

Because of such molding process, filter plates of any desired shape, configuration, or dimensions may be readily formed from a porous material in one continuous and contiguous piece. To this end, it should be appreciated that the molding process for each plate does not require the usage of a core pin as is typically required to prepare the conventionally known molded filters. As such, each molded filter plate can be prepare having a more uniform concentricity, thus enabling the manufacture of a more uniform and efficient stacked filter assembly. As used herein, the term concentricity is intended to refer, without limitation, to the concentration of porous material across the ridge wall and/or base plate portion of a given filter plate.

The particles used to form the porous plastic to be sintered can be formed by several processes known in the art. One such process is cryogenic grinding. Cryogenic grinding can be used to prepare thermoplastic particles of varying sizes. But because cryogenic grinding provides little control over the sizes of the particles it produces, powders formed using this technique may be screened to ensure that the particles to be sintered are of a desired average size and size distribution.

Underwater pelletizing can also be used to form thermoplastic particles suitable for sintering. Although typically limited to the production of particles having diameters of greater than about 36 μm, underwater pelletizing offers several advantages. First, it provides accurate control over the average size of the particles produced, in many cases thereby eliminating the need for an additional screening step and reducing the amount of wasted material. A second advantage of underwater pelletizing, which is discussed further herein, is that it allows significant control over the particles' shape.

Underwater pelletizing is described, for example, in U.S. Pat. No. 6,551,608 to Yao and U.S. Published Patent Application No. U.S. 2003-0062311-A1, filed Aug. 23, 2002, Ser. No. 10/226,235, both of which are incorporated herein by reference in their entirety. Thermoplastic particle formation using underwater pelletizing typically requires an extruder or melt pump, an underwater pelletizer, and a drier. The thermoplastic resin is fed into an extruder or a melt pump and heated until semi-molten. The semi-molten material is then forced through a die. As the material emerges from the die, at least one rotating blade cuts it into pieces herein referred to as "pre-particles." The rate of extrusion and the speed of the rotating blade(s) determine the shape of the particles formed from the pre-particles, while the diameter of the die holes determine their average size. Water, or some other liquid or gas capable of increasing the rate at which the pre-particles cool, flows over the cutting blade(s) and through the cutting chamber. This coagulates the cut material (i.e., the pre-particles) into particles, which are then separated from the coolant (e.g., water), dried, and expelled into a holding container.

In one aspect, the average size of particles produced by underwater pelletizing can be accurately controlled and can range from about 0.014" (35.6 μm) to about 0.125" (318 μm) in diameter, depending upon the thermoplastic. Average particle size can be adjusted simply by changing dies, with larger sized dies yielding proportionally larger particles. The average shape of the particles can be optimized by manipulating the extrusion rate and the temperature of the water used in the process.

The material used to form filter plate 110 can also be made with functional characteristics, such as antimicrobial activity, chlorine reduction activity, or the like. The material can also be treated to be antibacterial, such as by incorporating antimicrobial treatments into or onto the material. Such treatment addresses and corrects a common problem of bacterial growth in or on filters.

Some suitable antiviral or antimicrobial agents are disclosed in U.S. Pat. No. 6,551,608 to Yao, the disclosure of which is herein incorporated by reference. Some antiviral or antimicrobial agents include, but are not limited to: phenolic and chlorinated phenolic compounds; resorcinol and its derivatives; bisphenolic compounds; benzoic esters; halogenated carbanilides; polymeric antimicrobial agents; thazolines; trichloromethylthioimides; natural antimicrobial agents; metal salts; broad-spectrum antibiotics, and mixtures thereof. Preferred antiviral or antimicrobial agents include, but are not limited to: 2,4,4'-trichloro-2'-hydroxy-diphenyl ether; 3-(4-chlorophenyl)-1-(3,4-di-chlorophenyl)urea; poly (iminoimidocarbonyl iminoimidocarbonyl iminohexamethylene hydrochloride); silver ions; salts; mixtures thereof, or the like.

While the foregoing description and drawings represent embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description. The cartridge or parts of the cartridge can be made larger or smaller based on the intended application. Furthermore, multiples of the cartridge can be stacked together to achieve more surface area and thereby gain more capacity. Also, multiple stacks of multiple cartridges may be used.

What is claimed is:

1. A modular filter assembly, comprising:
   a plurality of stacked filter plates formed from a porous material, each filter plate comprising:
   a planar base portion having an outer peripheral edge, a top surface, and a bottom surface, and further defining at least one opening extending therebetween the respective top and bottom surface;
   a convoluted ridge wall extending from the top surface of the base portion and having a ridge outer side surface, a ridge inner side surface, and a top ridge surface, the convoluted wall surrounding the at least one opening;
   a plurality of fluid inlet troughs defined by the ridge outer side surface and a first portion of the base portion top surface; and
   a plurality of fluid outlet troughs defined by the ridge inner side surface and a second portion of the base portion top surface;

wherein at least a first and a second filter plate of the plurality of filter plates are stacked such that the ridge top surface of the first plate is contacting the bottom surface of the second plate;
a plurality of fluid inlet cavities defined by the fluid inlet trough of the first filter plate and a first portion of the bottom surface of the second filter plate; and
a plurality of fluid outlet cavities defined by the fluid outlet trough of the first filter plate and a second portion of the bottom surface of the second filter plate;
wherein the plurality of fluid inlet cavities are in filtered communication with the plurality of fluid outlet cavities such that a fluid passing from the fluid inlet cavity to the fluid outlet cavity must pass through at least one of the ridge and filter plate base portion.

2. The modular filter of claim 1, wherein the porous material comprises a sintered thermoplastic material.

3. The modular filter of claim 1, wherein the plurality of filter plates are identical.

4. The modular filter of claim 1, wherein the at least first and second filter plates are stacked such that at least a portion of the inlet troughs of the first filter plate are in underlying registration with at least a portion of the outlet troughs of the second filter plate.

5. The modular filter of claim 4, wherein the at least first and second filter plates are stacked such that each inlet trough of the first filter plate is in underlying registration with an outlet trough of the second filter plate.

6. The modular filter of claim 1, wherein the convoluted ridge wall is continuous.

7. The modular filter of claim 1, wherein the at least one opening extending therebetween the respective top and bottom surface has a peripheral edge defined by the plate base portion, and wherein said peripheral edge further defines at least one key for aligning the plurality of filter plates in a predetermined pattern of overlying registration.

8. The modular filter of claim 1, wherein the plurality of filter plates are stacked such that the at least one opening extending therebetween the respective top and bottom surface of each filter plate forms a conduit.

9. The modular filter of claim 8, wherein the plurality of fluid outlet cavities are in communication with the conduit.

10. The modular filter of claim 8, further comprising a core extending longitudinally through the at least one opening and comprising opposing proximal and distal ends, a first end cap affixed to the proximal end of the core proximate the top ridge surface of the second filter plate, and a second end cap affixed to the distal end of the core proximate the bottom surface of the planar base portion of the first filter plate.

11. The modular filter of claim 1, wherein the outer peripheral edge of the filter plate is substantially circular in shape.

12. The modular filter of claim 1, wherein the at least one opening extending therebetween the respective top and bottom surface of the filter plate base portion is positioned coaxially with a longitudinal axis of the filter plate.

13. The modular filter of claim 1, wherein the at least one opening extending therebetween the respective top and bottom surface of the filter plate is substantially circular in shape.

14. A modular filter assembly, comprising:
a plurality of stacked filter plates formed from a porous material, each filter plate comprising:
a planar base portion having an outer peripheral edge, a top surface, and a bottom surface;
a convoluted ridge wall extending from the top surface of the base portion and having a ridge outer side surface, a ridge inner side surface, and a top ridge surface;
a plurality of fluid inlet troughs defined by the ridge outer side surface and a first portion of the base portion top surface; and
a plurality of fluid outlet troughs defined by the ridge inner side surface and a second portion of the base portion top surface;
wherein at least a first and a second filter plate of the plurality of filter plates are stacked such that the ridge top surface of the first plate is contacting the bottom surface of the second plate;
a plurality of fluid inlet cavities defined by the fluid inlet trough of the first filter plate and a first portion of the bottom surface of the second filter plate; and
a plurality of fluid outlet cavities defined by the fluid outlet trough of the first filter plate and a second portion of the bottom surface of the second filter plate;
wherein the plurality of fluid inlet cavities are in filtered communication with the plurality of fluid outlet cavities such that a fluid passing from the fluid inlet cavity to the fluid outlet cavity must pass through at least one of the ridge and filter plate base portion.

15. The modular filter of claim 14, wherein the porous material comprises a sintered thermoplastic material.

16. The modular filter of claim 14, wherein the plurality of filter plates are identical.

17. The modular filter of claim 14, wherein the at least first and second filter plates are stacked such that at least a portion of the inlet troughs of the first filter plate are in underlying registration with at least a portion of the outlet troughs of the second filter plate.

18. The modular filter of claim 17, wherein the at least first and second filter plates are stacked such that each inlet trough of the first filter plate is in underlying registration with an outlet trough of the second filter plate.

19. The modular filter of claim 14, wherein the convoluted ridge wall is continuous.

20. A method of filtering a contaminant from a fluid stream comprising the steps of:
providing a plurality of filter plates formed from a porous material each comprising:
a planar base portion having an outer peripheral edge, a top surface, and a bottom surface;
a convoluted ridge wall extending from the top surface of the base portion and having a ridge outer side surface, a ridge inner side surface, and a top ridge surface;
a plurality of fluid inlet troughs defined by the ridge outer side surface and a first portion of the base portion top surface; and
a plurality of fluid outlet troughs defined by the ridge inner side surface and a second portion of the base portion top surface;
stacking at least a first and second filter plate of the plurality of filter plates in a stacked arrangement to form a modular filter assembly, wherein in the stacked arrangement the ridge top surface of the first plate is contacting the bottom surface of the second plate, a plurality of fluid inlet cavities are defined by the fluid inlet troughs of the first filter plate and a first portion of the bottom surface of the second filter plate, and a plurality of fluid outlet cavities are defined by the fluid outlet troughs of the first filter plate and a second portion of the bottom surface of the second filter plate, wherein the plurality of fluid inlet cavities are in filtered communication with the plurality of fluid outlet cavities such that a fluid passing from the fluid inlet cavity to the fluid outlet cavity must pass through at least one of the ridge and filter plate base portion; and passing a fluid containing a particulate contaminant from at least one fluid inlet cavity to at least one fluid outlet cavity.

21. The method of claim 20, wherein each of the plurality of filter plates defines at least one opening extending therebetween the respective top and bottom surface of a respective planar base portion, and wherein the convoluted ridge wall surrounds the at least one opening.

22. The method of claim 21, wherein the step of stacking further comprises stacking the filter plates such that the at least one opening extending therebetween the respective top and bottom surface of each filter plate forms a conduit.

23. The method of claim 22, further comprising positioning a core within the conduit, providing a first end cap and a second end cap, positioning the first end cap at the top of the stacked arrangement proximate the top ridge surface of the second filter plate, positioning the second end cap at the bottom of the stacked arrangement proximate the bottom surface of the first filter plate planar base, and securing the first and second end caps to respective top and bottom ends of the core to maintain the modular filter assembly in the stacked arrangement.

24. The method of claim 22, wherein the plurality of fluid outlet cavities are in communication with the conduit.

* * * * *